US007926070B2

(12) United States Patent
Sedukhin et al.

(10) Patent No.: US 7,926,070 B2
(45) Date of Patent: Apr. 12, 2011

(54) PERFORMING REQUESTED COMMANDS FOR MODEL-BASED APPLICATIONS

(75) Inventors: Igor Sedukhin, Issaquah, WA (US); Daniel Eshner, Issaquah, WA (US); Erik B. Christensen, Seattle, WA (US); Amol Sudhakar Kulkarni, Bothell, WA (US); Prasad Sripathi Panditharadhya, Sammamish, WA (US); Girish Mittur Venkataramanappa, Redmond, WA (US); Vladimir Pogrebinsky, Sammamish, WA (US); Haoran Andy Wu, Sammamish, WA (US); Stephen T. Swartz, Snohomish, WA (US); Sundeep Sahi, Seattle, WA (US); Sumit Mohanty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 11/925,067

(22) Filed: Oct. 26, 2007

(65) Prior Publication Data

US 2009/0113457 A1    Apr. 30, 2009

(51) Int. Cl.
G06F 3/00       (2006.01)
(52) U.S. Cl. .......................................... 719/321; 719/328
(58) Field of Classification Search .................. 719/321, 719/328
See application file for complete search history.

(56) References Cited

U.S. PATENT DOCUMENTS

| | | | |
|---|---|---|---|
| 4,751,635 A | 6/1988 | Kret | |
| 5,423,003 A | 6/1995 | Berteau | |
| 5,602,991 A | 2/1997 | Berteau | |
| 5,655,081 A | 8/1997 | Bonnell | |
| 5,764,241 A | 6/1998 | Elliott | |
| 5,809,266 A | 9/1998 | Touma | |
| 5,893,083 A | 4/1999 | Eshghi | |
| 5,913,062 A * | 6/1999 | Vrvilo et al. | 719/321 |
| 5,937,388 A | 8/1999 | Davis et al. | |
| 5,958,010 A | 9/1999 | Agarwal | |
| 6,005,849 A * | 12/1999 | Roach et al. | 370/276 |
| 6,026,404 A | 2/2000 | Adunuthula | |
| 6,055,363 A | 4/2000 | Beals et al. | |
| 6,070,190 A | 5/2000 | Reps | |
| 6,225,995 B1 | 5/2001 | Jacobs | |
| 6,247,056 B1 | 6/2001 | Chou | |
| 6,279,009 B1 | 8/2001 | Smirnov et al. | |

(Continued)

FOREIGN PATENT DOCUMENTS

EP    1770510    4/2007

(Continued)

OTHER PUBLICATIONS

Shaojie Wang, Synthesizing Operating System Based device Drivers in Embedded Systems, 2003.*

(Continued)

*Primary Examiner* — Lechi Truong
(74) *Attorney, Agent, or Firm* — Workman Nydegger (57) ABSTRACT

The present invention extends to methods, systems, and computer program products for performing requested commands for model-based applications. Embodiments of the invention permit efficient implementation of operations for model-based applications. Since drivers that are to implement an operation request data for implementing the operation, embodiments significantly reduce the likelihood of superfluous data being exchanged between an executive service and drivers. Further, if an operation is interrupted before implementation is complete, the operation can be resumed without having to re-perform already completed portions of the operation. Additionally, a user can be regularly updated on the progress of their commands.

16 Claims, 4 Drawing Sheets

U.S. PATENT DOCUMENTS

| | | |
|---|---|---|
| 6,330,717 B1 | 12/2001 | Raverdy |
| 6,334,114 B1 | 12/2001 | Jacobs |
| 6,336,217 B1 | 1/2002 | D'Anjou et al. |
| 6,477,665 B1 | 11/2002 | Bowman-Amuah |
| 6,618,719 B1 | 9/2003 | Andrei |
| 6,640,241 B1 | 10/2003 | Ozzie |
| 6,654,783 B1 | 11/2003 | Hubbard |
| 6,662,205 B1 | 12/2003 | Bereiter |
| 6,697,877 B1 | 2/2004 | Martin |
| 6,710,786 B1 | 3/2004 | Jacobs |
| 6,715,145 B1 | 3/2004 | Bowman-Amuah |
| 6,718,535 B1 | 4/2004 | Underwood |
| 6,801,818 B2 | 10/2004 | Kopcha |
| 6,847,970 B2 | 1/2005 | Keller et al. |
| 6,854,069 B2 | 2/2005 | Kampe |
| 6,886,024 B1 | 4/2005 | Fujita |
| 6,907,395 B1 | 6/2005 | Hunt |
| 6,931,644 B2 | 8/2005 | Riosa |
| 6,934,702 B2 | 8/2005 | Faybishenko |
| 6,941,341 B2 | 9/2005 | Logston |
| 7,051,098 B2 | 5/2006 | Masters |
| 7,055,143 B2 | 5/2006 | Ringseth et al. |
| 7,065,579 B2 | 6/2006 | Traversat |
| 7,072,807 B2 | 7/2006 | Brown |
| 7,072,934 B2 | 7/2006 | Helgeson |
| 7,079,010 B2 | 7/2006 | Champlin |
| 7,085,837 B2 | 8/2006 | Kimbrel |
| 7,096,258 B2 | 8/2006 | Hunt |
| 7,103,874 B2 | 9/2006 | McCollum et al. |
| 7,130,881 B2 | 10/2006 | Volkov et al. |
| 7,150,015 B2 | 12/2006 | Pace et al. |
| 7,155,380 B2 | 12/2006 | Hunt |
| 7,155,466 B2 | 12/2006 | Rodriguez |
| 7,162,509 B2 | 1/2007 | Brown et al. |
| 7,168,077 B2 | 1/2007 | Kim |
| 7,174,359 B1 | 2/2007 | Hamilton, II et al. |
| 7,178,129 B2 | 2/2007 | Katz |
| 7,200,530 B2 | 4/2007 | Brown |
| 7,219,351 B2 | 5/2007 | Bussler et al. |
| 7,263,689 B1 | 8/2007 | Edwards et al. |
| 7,512,707 B1 | 3/2009 | Manapragada |
| 2002/0035593 A1 | 3/2002 | Salim et al. |
| 2002/0038217 A1 | 3/2002 | Young |
| 2002/0099818 A1 | 7/2002 | Russell et al. |
| 2002/0111841 A1 | 8/2002 | Leymann |
| 2002/0120917 A1 | 8/2002 | Abrari et al. |
| 2002/0133504 A1 | 9/2002 | Vlahos et al. |
| 2002/0135611 A1 | 9/2002 | Deosaran |
| 2002/0147515 A1 | 10/2002 | Fava et al. |
| 2002/0147962 A1 | 10/2002 | Hatanaka |
| 2002/0198734 A1 | 12/2002 | Greene |
| 2003/0005411 A1 | 1/2003 | Gerken |
| 2003/0061342 A1 | 3/2003 | Abdelhadi |
| 2003/0084156 A1 | 5/2003 | Graupner et al. |
| 2003/0135384 A1 | 7/2003 | Nguyen |
| 2003/0149685 A1 | 8/2003 | Trossman |
| 2003/0195763 A1 | 10/2003 | Gulcu |
| 2004/0034850 A1 | 2/2004 | Burkhardt |
| 2004/0046785 A1 | 3/2004 | Keller |
| 2004/0078461 A1 | 4/2004 | Bendich et al. |
| 2004/0088350 A1 | 5/2004 | Early |
| 2004/0102926 A1 | 5/2004 | Adendorff |
| 2004/0148184 A1 | 7/2004 | Sadiq |
| 2004/0162901 A1 | 8/2004 | Mangipudi |
| 2005/0005200 A1 | 1/2005 | Matena et al. |
| 2005/0011214 A1 | 2/2005 | Schwetfuehrer |
| 2005/0055692 A1 | 3/2005 | Lupini |
| 2005/0071737 A1 | 3/2005 | Adendorff |
| 2005/0074003 A1 | 4/2005 | Ball |
| 2005/0091227 A1 | 4/2005 | McCollum et al. |
| 2005/0120106 A1 | 6/2005 | Albertao |
| 2005/0125212 A1 | 6/2005 | Hunt et al. |
| 2005/0132041 A1 | 6/2005 | Kundu |
| 2005/0137839 A1 | 6/2005 | Mansurov |
| 2005/0155042 A1 | 7/2005 | Kolb et al. |
| 2005/0165906 A1 | 7/2005 | Deo et al. |
| 2005/0188075 A1 | 8/2005 | Dias |
| 2005/0216831 A1 | 9/2005 | Guzik |
| 2005/0261875 A1 | 11/2005 | Shrivastava |
| 2005/0268307 A1 | 12/2005 | Gates et al. |
| 2005/0278702 A1 | 12/2005 | Koyfman |
| 2005/0283518 A1 | 12/2005 | Sargent |
| 2006/0010142 A1 | 1/2006 | Kim |
| 2006/0010164 A1 | 1/2006 | Netz |
| 2006/0013252 A1 | 1/2006 | Smith |
| 2006/0036743 A1 | 2/2006 | Deng |
| 2006/0064460 A1 | 3/2006 | Sugawara |
| 2006/0070066 A1 | 3/2006 | Grobman |
| 2006/0070086 A1 | 3/2006 | Wang |
| 2006/0074734 A1 | 4/2006 | Shukla |
| 2006/0123389 A1 | 6/2006 | Kolawa et al. |
| 2006/0123412 A1 | 6/2006 | Hunt |
| 2006/0155738 A1 | 7/2006 | Baldwin |
| 2006/0173906 A1 | 8/2006 | Chu et al. |
| 2006/0206537 A1 | 9/2006 | Chiang |
| 2006/0230314 A1 | 10/2006 | Sanjar |
| 2006/0235859 A1 | 10/2006 | Hardwick |
| 2006/0265231 A1 | 11/2006 | Fusaro et al. |
| 2006/0277323 A1 | 12/2006 | Joublin |
| 2006/0277437 A1 | 12/2006 | Ohtsuka |
| 2006/0294506 A1 | 12/2006 | Dengler |
| 2007/0005283 A1 | 1/2007 | Blouin et al. |
| 2007/0005299 A1 | 1/2007 | Haggerty |
| 2007/0006122 A1 | 1/2007 | Bailey et al. |
| 2007/0016615 A1 | 1/2007 | Mohan et al. |
| 2007/0033088 A1 | 2/2007 | Aigner et al. |
| 2007/0050237 A1 | 3/2007 | Tien |
| 2007/0050483 A1 | 3/2007 | Bauer et al. |
| 2007/0061776 A1 | 3/2007 | Ryan et al. |
| 2007/0067266 A1 | 3/2007 | Lomet |
| 2007/0088724 A1 | 4/2007 | Demiroski |
| 2007/0089117 A1 | 4/2007 | Samson |
| 2007/0094350 A1 | 4/2007 | Moore |
| 2007/0112847 A1 | 5/2007 | Dublish |
| 2007/0174228 A1 | 7/2007 | Folting |
| 2007/0174815 A1 | 7/2007 | Chrysanthakopoulos et al. |
| 2007/0179823 A1 | 8/2007 | Bhaskaran |
| 2007/0208606 A1 | 9/2007 | MacKay |
| 2007/0220177 A1 | 9/2007 | Kothari et al. |
| 2007/0244904 A1 | 10/2007 | Durski |
| 2007/0277109 A1 | 11/2007 | Chen |
| 2008/0005729 A1 | 1/2008 | Harvey |
| 2008/0010631 A1 | 1/2008 | Harvey et al. |
| 2008/0244423 A1 | 10/2008 | Jensen-Pistorius |
| 2009/0197662 A1 | 8/2009 | Manapragada |
| 2009/0265458 A1 | 10/2009 | Baker |
| 2010/0005527 A1 | 1/2010 | Jeon |

FOREIGN PATENT DOCUMENTS

| | | |
|---|---|---|
| WO | 0124003 | 4/2001 |
| WO | WO0227426 A2 | 4/2002 |
| WO | 2007072501 | 6/2007 |

OTHER PUBLICATIONS

Office Action dated Apr. 5, 2010 cited in U.S. Appl. No. 11/771,827.
Office Action dated Apr. 13, 2010 cited in U.S. Appl. No. 11/925,326.
OSLO>Suite 2006, "OSLO Suite is the leading platform for designing, building and executing adaptive business solutions", .oslo-software.com/en/product.php.
Office Action dated Mar. 18, 2010 cited in U.S. Appl. No. 11/740,737.
U.S. Appl. No. 11/925,326, mail date Jul. 22, 2010, Notice of Allowance.
U.S. Appl. No. 11/925,079, mail date Sep. 1, 2010, Office Action.
U.S. Appl. No. 11/740,737, mail date Sep. 13, 2010, Office Action.
Alpern, Bowen, et al, "PDS: A Virtual Execution Environment for Software Deployment", 2005, pp. 175-185.
Talcott, Carolyn L., MTCoord 2005 Preliminary Version, "Coordination Models Based on a Formal Model of Distributed Object Reflection", 13 pages.
Leymann, F., et al., "Web Services and Business Process Management", IBM Systems Journal, vol. 41, No. 2, 2002, New Developments in Web Services and E-commerce, 11 pages.
U.S. Appl. No. 12/105,083, filed Apr. 17, 2008 (Not Yet Published).

Office Action dated Mar. 2, 2010 cited in U.S. Appl. No. 11/771,816.
U.S. Appl. No. 11/844,177, filed Aug. 23, 2007, Sedukhin.
U.S. Appl. No. 11/740,737, filed Apr. 26, 2007, Sedukhin.
U.S. Appl. No. 11/771,827, filed Jun. 29, 2007, Sedukhin.
U.S. Appl. No. 11/771,816, filed Jun. 29, 2007, Sedukhin.
U.S. Appl. No. 11/925,079, filed Oct. 26, 2007, Bhaskar.
U.S. Appl. No. 11/925,326, filed Oct. 26, 2007, Christensen.
U.S. Appl. No. 11/925,680, filed Oct. 26, 2007, Sedukhin.
U.S. Appl. No. 11/925,591, filed Oct. 26, 2007, Sedukhin.
U.S. Appl. No. 11/925,184, filed Oct. 26, 2007, Voss.
U.S. Appl. No. 11/925,201, filed Oct. 26, 2007, Sedukhin.
U.S. Appl. No. 60/983,117, filed Oct. 26, 2007, Skierkowski.
Frecon, Emmanuel, et al., "DIVE: a scaleable network architecture for distributed virtual environments", The British Computer Society, The Institution of Electrical Engineers and IOP Publishing Ltd, Mar. 6, 1998, pp. 91-100.
Baldi, Mario, et al., "Exploiting Code Mobility in Decentralized and Flexible Network Management", Lecture Notes in Computer Science, vol. 1219, Proceedings of the First International Workshop on Mobile Agents, pp. 13-26.
Milenkovic, Milan, et al., "Towards Internet Distributed Computing", Sep. 26, 2003, m.students.umkc.edu/mpshxf/Towards_IDC.pdf.
"Managing Complexity in Middleware", by Adrian Colyer, Gordon Blair and Awais Rashid, IBM UK Limited, Hursley Park, Winchester, England and Computing Department, Lancaster University, Bailrigg, Lancaster, England, [online] [retrieved on Apr. 20, 2007], 6 pages. Retrieved from the Internet: 222.aosd.net/2005/workshops/acp4is/past/asp4is03/papers/colyer.pdf.
"User Interface Declarative Models and Development Environments: A Survey", by Paulo Pinheiro Da Silva, Department of Computer Science, University of Manchester, Manchester, England [online] [retrieved on Apr. 20, 2007], 20 pages. Retrieved from the Internet: .cs.utep.edu/paulo/papers/PinheirodaSilva_DSVIS_2000.pdf.
"Architecturing and Configuring Distributed Application with Olan", by R. Balter, L. Bellissard, F. Boyer, M Riveill and J.Y. Vion-Dury, Middleware 98 Conference Report, INRIA, France, [online] [retrieved on Apr. 20, 2007], 15 pages. Retrieved from the Internet: .comp.lancs.ac.uk/computing/middleware98/papers.html.
"A Load Balancing Module for the Apache Web Server", Author Unknown, [online] [retrieved on Apr. 20, 2007], 9 pgs. Retrieved from the Internet: .backhand.org/ApacheCon2000/US/mod_backhand_coursenotes.pdf.
"Performance Tuning and Optimization of J2ee Applications on the Jboss Platform", by Samuel Kounev, Bjorn Weis and Alejandro Duchmann, Department of Computer Science, Darmstadt University of Technology, Germany, [online] [retrieved on Apr. 20, 2007], 10 pgs. Retrieved from the Internet: .cl.cam.ac.uk/~sk507/pub/04-cmg-JBoss.pdf.
"Outlier Detection for Fine-Grained Load Balancing in Database Clusters", by Jin Chen, Gokul Soundararajan, Madalin Mihailescu and Cristiana Amza, Department of Computer Science, Department of Electrical and Computer Engineering, University of Toronto, [online] [retrieved on Apr. 20, 2007], 10 pgs. Retrieved from the Internet: .cs.toronto.edu/~jinchen/papers/smdb07.pdf.
Dias, M. Bernardine, et al., "A Real-Time Rover Executive Based on Model-Based Reactive Planning" The 7th International Symposium on Artifical Intelligence, Robotics and Automation in Space, May 2003.

Goble, Carole, et al., "Building Large-scale, Service-Oriented Distrubuted Systems using Semantic Models", .jisc.ac.uk/media/documents/programmes/capital/grid_standards_above_ogsa.pdf, 21 pages.
Robinson, William N., "Implementing Rule-based Monitors within a Framework for continuous Requirements Monitoring" Proceedings of the 38th Hawaii International Conference on System Sciences, 2005 IEEE, 10 pages.
Maghraoui, Kaoutar El, et al., "Model Driven Provisionings: Bridging the Gap Between Declarative Object Models and Procedural Provisioning Tools", wcl.cs.rpi.edu/papers/middleware06.pdf.
Ivan, A.-A, et al., "Partionable services: A framework for seamlessly adapting distributed applications to heterogeneous environments", High Performance Distributed Computing, 2002. HPDC-11 2002. Proceedings. 11th IEEE International Symposium, 1 page.
Urban, Susan D., et al., "Active Declarative Integration Rules for Developing Distributed Multi-Tiered Applications", 3 pages.
Bischoff, Urs, et al., "Programming the Ubiquitous Network: A Top-Down Approach" System Support for Ubiquitous Computing Workshop (UbiSys'06), Orange County, USA, Sep. 2006, 8 pages.
Korb, John T., et al., "Command Execution in a Heterogeneous Environment", 1986 ACM, pp. 68-74.
Von, Vorgelet, et al., "Dynamic Upgrade of Distributed Software Components", 2004, 191 pages.
Poslad, Stefan, et al., "The FIPA-OS agent platform: Open Source for Open Standards", Apr. 2000, 17 pages.
Software News, "Progress Software Extends Lead in Distributed SOA" 2007, 6 pages.
Eidson, Thomas M., "A Component-based Programming Model for Composite, Distributed Applications", Institute for Computer Applications in Science and Engineering Hampton, VA, May 2001, 1 page.
Bauer, Michael A., "Managing Distributed Applications and Systems: An Architectural Experiment", Jan. 31, 1997, 46 pages.
Tawfik, Sam, "Composite applications and the Teradata EDW", Extend the capabilities of your enterprise data warehouse with supporting applications, Teradata Magazine online, Archive: vol. 6, No. 4, Dec. 2006, 3 pages.
Albrecht, Jeannie, et al., "Remote Control: Distributed Application Configuration Managment, and Visualization with Plush", Proceedings of the Twenty-first USENIX Large Installation System Administration Conference (LISA), Nov. 2007, 16 pages.
Office Action dated Sep. 14, 2009 cited in U.S. Appl. No. 11/740,737.
Office Action dated Oct. 14, 2009 cited in U.S. Appl. No. 11/771,827.
Office Action dated Oct. 1, 2009 cited in U.S. Appl. No. 11/771,816.
Nastel Technologies, Inc., "AutoPilot Business Dashboard Configuration and User's Guide Version 4.4", 2006, AP/DSB 440.001, 82 pages.
TIBCO The Power of Now, "TIBCO Business Factor", 2006, 2 pages.
TIBCO .tibco.com/software/business_activity_monitoring/businessfactor/default.jsp, Copyright 2000-2007, 2 pages.
"Factal:Edge Enlists CMLgroup to Bring Visualization to Business Performance Management Clients", extranet.fractaledge.com/News/PressReleases/2006/060829, 2006, 2 pages.

* cited by examiner

PERFORMING REQUESTED COMMANDS FOR MODEL-BASED APPLICATIONS

CROSS-REFERENCE TO RELATED APPLICATIONS

N/A.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs. In general, distributed application programs comprise components that are executed over several different hardware components, often on different computer systems in a network or tiered environment.

With distributed application programs, the different computer systems may communicate various processing results to each other over a network. Along these lines, an organization will employ a distributed application server to manage several different distributed application programs over many different computer systems. For example, a user might employ one distributed application server to manage the operations of an ecommerce application program that is executed on one set of different computer systems. The user might also use the distributed application server to manage execution of customer management application programs on the same or even a different set of computer systems.

Of course, each corresponding distributed application managed through the distributed application server can, in turn, have several different modules and components that are executed on still other different computer systems. One can appreciate, therefore, that while this ability to combine processing power through several different computer systems can be an advantage, there are various complexities associated with distributing application program modules. For example, a distributed application server may need to run distributed applications optimally on the available resources, and take into account changing demand patterns and resource availability.

Unfortunately, conventional distributed application servers are typically ill-equipped (or not equipped at all) to automatically manage and adjust to all of the different complexities associated with a distributed application. For example, an organization may have an online store application program that is routinely experiences increase demand when there is a promotion, or during the same holidays each year. As such, the organization may expect the distributed application server to analyze and anticipate these fluctuating demands on various components or modules of the given distributed application program.

In particular, the organization may expect the distributed application server to swap around various resources so that high-demand processes can be handled by software and hardware components on other systems that may be less busy. Further, the organization may expect distributed components to exchange only relevant information necessary for proper execution of the distributed application so as to increase available resources in the high-demand environment. However, these and other accommodations can be difficult, if not impossible, to implement with conventional distributed application server platforms.

For example, most conventional distributed application server platforms are ill-equipped or otherwise unable to identify and properly manage different demand patterns between components of a distributed application program. This is due at least partly to the complexity in managing application programs that can have many distributed components and subsystems, many of which are long-running workflows, and/or otherwise legacy or external systems.

Further, most distributed application servers fail to regulate or otherwise manage the amount of data that is transferred between components to implement an application related command. For example, deployment of a distributed application can require significantly more information to implement than stopping or starting the distributed application. However, the same amount of data is transferred between components to implement any of the commands. The component receiving the data simply ignores any non-relevant information in the case of a stop or start command. Thus, resources can be unnecessarily consumed.

In addition, conventional distributed application program servers are generally not configured for efficient scalability. For example, most distributed application servers are configured to manage precise instructions of the given distributed application program, such as precise reference and/or component addressing schemes. That is, there is a relatively tight coupling between components of an application program. As such, when an administrator desires to redeploy certain modules or components onto another server or set of computer systems, there is always some (and potentially a significant) possibility of redeployment causing errors to occur (e.g., due to differences in network protocols, system configurations, etc.) These errors, such as, for example, an inability to locate needed resources, can occur when messages are not passed onward everywhere they are needed, or if they are passed onward incorrectly.

BRIEF SUMMARY

The present invention extends to methods, systems, and computer program products for performing requested commands for model-based applications. An executive service receives a command for implementing an operation related to an application model. The executive service opens a duplex channel to a driver manager. The driver manager has access to drivers that can interpret the application model to implement the operation. The executive service sends the command to the driver manager over the same duplex channel. The command includes a reference to the application model and semantics indicating how to process the application model.

The driver manager receives the command from the executive service over the duplex channel. The driver manager initiates implementation of the operation through a corresponding driver in response to receiving the command. The driver manager identifies a tailored set of one or more specific resources for completing implementation of the operation subsequent to initiating implementation of the operation. The tailored set is tailored to limit the amount of model related data exchanged between the executive service and the driver manager. The driver manager sends a call to the executive service over the duplex channel to request the tailored set of one or more specific resources.

The executive service receives the call from the driver manager over the duplex channel. The executive service sends the tailored set of one or more resources to the driver manager over the duplex channel in response to the call from the driver manager. The driver manager receives the tailored set of one or more resources from the executive service over the duplex channel.

The driver manager implements the operation for the application model based on the tailored set of one or more resources. The driver manager sends results of implementing the operation to the executing service over the duplex channel. The executive service receives the results of implementing the operation from the driver manager over the duplex channel.

After initiating implementation of the operation, the driver manager can, from time to time, check with executive service to determine if the command has been cancelled. In some embodiments, prior to completely implementing the operation, the driver manager receives an indication from the executive service that the command has been cancelled. In response to the indication, the driver manager calls the corresponding driver to stop implementation of the operation. In some embodiments, all communication between the executive service and the driver manager occurs on the initially established duplex channel.

The driver manager subsequently receives an indication from the driver that implementation of the operation has been stopped. The driver manager returns cancellation results to the executive service over the duplex channel. The cancellation results indicate to the executive service that implementation of the operation has been stopped.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for performing requested commands for model-based applications. An executive service receives a command for implementing an operation related to an application model. The executive service opens a duplex channel to a driver manager. The driver manager has access to drivers that can interpret the application model to implement the operation. The executive service sends the command to the driver manager over the same duplex channel. The command includes a reference to the application model and semantics indicating how to process the application model.

The driver manager receives the command from the executive service over the duplex channel. The driver manager initiates implementation of the operation through a corresponding driver in response to receiving the command. The driver manager identifies a tailored set of one or more specific resources for completing implementation of the operation subsequent to initiating implementation of the operation. The tailored set is tailored to limit the amount of model related data exchanged between the executive service and the driver manager. The driver manager sends a call to the executive service over the duplex channel to request the tailored set of one or more specific resources.

The executive service receives the call from the driver manager over the duplex channel. The executive service sends the tailored set of one or more resources to the driver manager over the duplex channel in response to the call from the driver manager. The driver manager receives the tailored set of one or more resources from the executive service over the duplex channel.

The driver manager implements the operation for the application model based on the tailored set of one or more resources. The driver manager sends results of implementing the operation to the executing service over the duplex channel. The executive service receives the results of implementing the operation from the driver manager over the duplex channel.

The process of the driver manager asking for resources, and getting back the resources over the duplex channel and also the driver manager reporting back the operation progress over the duplex channel to the executive service can repeat several times in no specific order while the command execution is in progress.

After initiating implementation of the operation, the driver manager can, from time to time, check with executive service to determine if the command has been cancelled. In some embodiments, prior to completely implementing the operation, the driver manager receives an indication from the executive service that the command has been cancelled. In response to the indication, the driver manager calls the corresponding driver to stop implementation of the operation. In some embodiments, all communication between the executive service and the driver manager occurs on the initially established duplex channel.

The driver manager subsequently receives an indication from the driver that implementation of the operation has been stopped. The driver manager returns cancellation results to the executive service over the duplex channel. The cancellation results indicate to the executive service that implementation of the operation has been stopped.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
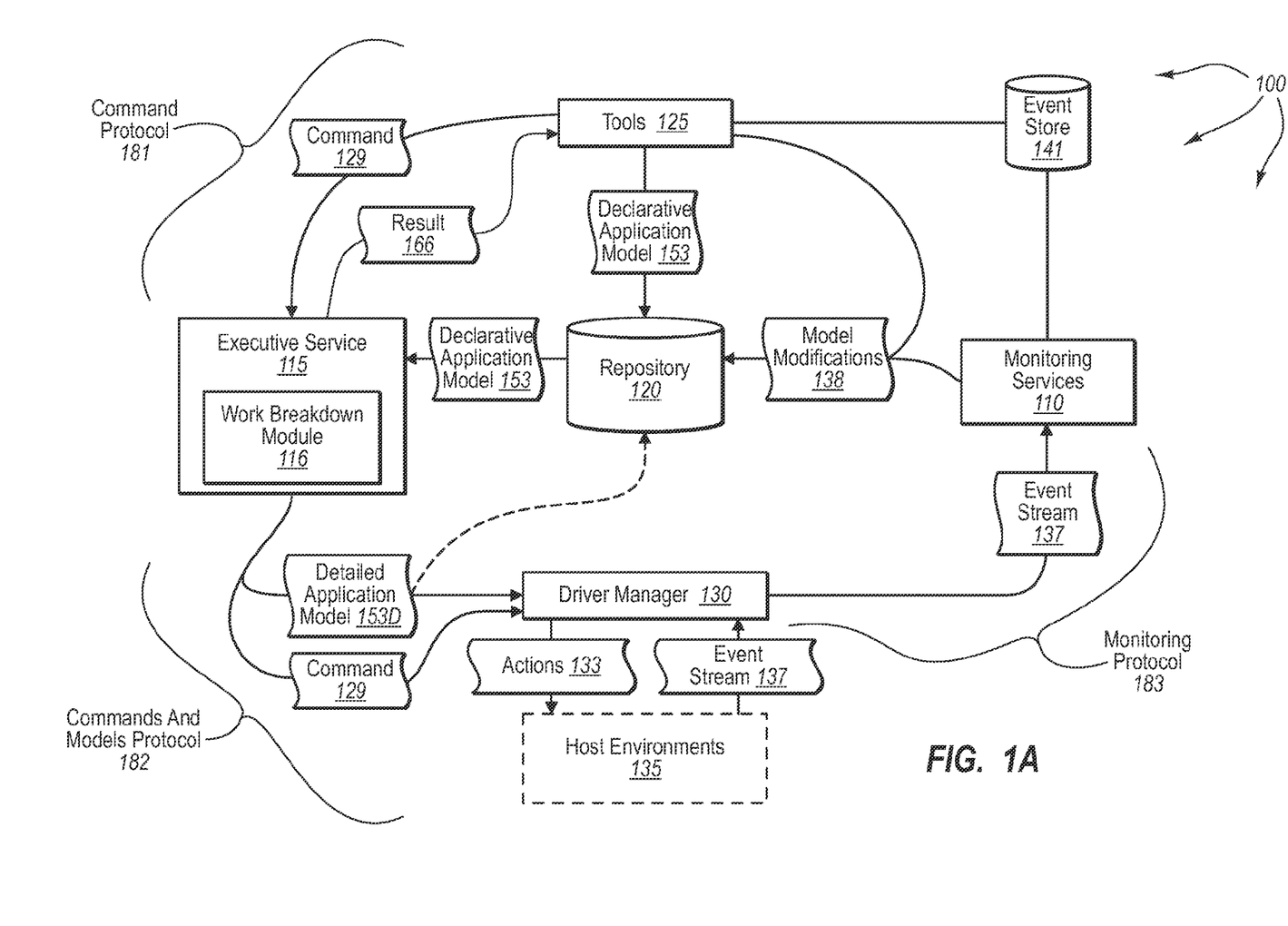
FIG. 1A illustrates an example computer architecture that facilitates performing requested commands for model-based applications.

FIG. 1A illustrates an example computer architecture 100 that facilitates performing requested commands for model based applications. Depicted in computer architecture 100 are tools 125, repository 120, executive module 115, driver manager 130, drivers 142, host environments 135, monitoring service 110, and events store 141. Each of the depicted components can be connected to one another over a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, tools 125 can be used to write and modify (e.g., through model modifications 138) declarative models for applications and store declarative models, such as, for example, declarative application model 153, in repository 120. Declarative models are used to describe the structure and behavior of real-world running (deployed) applications. Thus, a user (e.g., distributed application program developer) can use one or more of tools 125 to create declarative application model 153.

Generally, declarative models include one or more sets of high-level declarations expressing application intent for a distributed application. Thus, the high-level declarations generally describe operations and/or behaviors of one or more modules in the distributed application program. However, the high-level declarations do not necessarily describe implementation steps required to deploy a distributed application having the particular operations/behaviors (although they can if appropriate). For example, declarative application model 153 can express the generalized intent of a workflow, including, for example, that a first Web service be connected to a database. However, declarative application model 153 does not necessarily describe how (e.g., protocol), nor where (e.g., address) the Web service and database are to be connected to one another. In fact, how and where is determined based on which computer systems the database and the Web service are deployed.

To deploy an application based on a declarative model, the declarative model can be sent to executive module 115. Executive module 115 can refine the declarative model until there are no ambiguities and the details are sufficient for drivers to consume. Thus, executive module 115 can receive and refine declarative model 153 so that declarative model 153 can be translated by drivers 142 (e.g., one or more technology-specific drivers) into a deployed application.

Tools 125 and executive service 115 can exchange commands for model-based applications and corresponding results using command protocol 181.

In general, "refining" a declarative model can include some type of work breakdown structure, such as, for example, progressive elaboration, so that the declarative model instructions are sufficiently complete for translation by drivers 142. Since declarative models can be written relatively loosely by a human user (i.e., containing generalized intent instructions or requests), there may be different degrees or extents to which executive module 115 modifies or supplements a declarative model for deploying an application. Work breakdown module 116 can implement a work breakdown structure algorithm, such as, for example, a progressive elaboration algorithm, to determine when an appropriate granularity has been reached and instructions are sufficient for drivers.

Executive module 115 can also account for dependencies and constraints included in a declarative model. For example, executive module 115 can be configured to refine declarative model 153 based on semantics of dependencies between elements in the declarative model 153 (e.g., one web service connected to another). Thus, executive module 115 and work breakdown module 116 can interoperate to output detailed application model 153D that provides driver 130 with sufficient information to deploy distributed application 107.

In additional or alternative implementations, executive module 115 can also be configured to refine the declarative model 153 based on some other contextual awareness. For example, executive module 115 can refine the declarative model based on the inventory of host environments 135 that may be available in the datacenter where a distributed application program will be deployed. Executive module 115 can reflect contextual awareness information in detailed application model 153D.

In addition, executive module 115 can be configured to fill in missing data regarding computer system assignments. For example, executive module 115 might identify a number of different distributed application program modules in declarative model 153 that have no requirement for specific computer system addresses or operating requirements. Thus, executive module 115 can assign distributed application program modules to an available host environment on a computer system. Executive module 115 can reason about the best way to fill in data in a refined declarative model 153. For example, as previously described, executive component 115 may determine and decide which transport to use for an endpoint based on proximity of connection, or determine and decide how to allocate distributed application program modules based on factors appropriate for handling expected spikes in demand. Executive module 115 can then record missing data in detailed declarative model 153D (or segment thereof).

In addition or alternative implementations, executive module 115 can be configured to compute dependent data in the declarative model 153. For example, executive module 115 can compute dependent data based on an assignment of distributed application program modules to host environments on computer systems. Thus, executive module 115 can calculate URI addresses on the endpoints, and propagate the corresponding URI addresses from provider endpoints to consumer endpoints. In addition, executive module 115 may evaluate constraints in the declarative model 153. For example, the executive component 115 can be configured to check to see if two distributed application program modules can actually be assigned to the same machine, and if not, executive module 115 can refine detailed declarative model 153D to accommodate this requirement.

Accordingly, after adding appropriate data (or otherwise modifying/refining) to declarative model 153 (to create detailed application model 153D), executive component 115 can finalize the refined detailed application model 153D so that it can be translated by platform-specific drivers. To finalize or complete the detailed application model 153D, executive module 115 can, for example, partition a declarative application model into segments that can be targeted by any one or more platform-specific drivers. Thus, executive module 115 can tag each declarative application model (or segment thereof) with its target driver (e.g., the unique ID or an address of a platform-specific driver).

Furthermore, executive module 115 can verify that a detailed application model (e.g., 153D) can actually be translated by one or more platform-specific drivers, and, if so, pass the detailed application model (or segment thereof) to a particular platform-specific driver for translation. For example, executive module 115 can be configured to tag portions of detailed application model 153D with labels indicating an intended implementation for portions of detailed application model 153D. An intended implementation can include a framework and/or a host, such as, for example, WCF-IIS, Aspx-IIS, SQL, Axis-Tomcat, WF/WCF-WAS, etc.

After refining a model, executive module 115 can forward the model to driver manger 130 or store the refined model back in repository 120 for later use. Thus, executive module 115 can forward detailed application model 153D to driver manager 130 or store detailed application model 153D in repository 120. When detailed application model 153D is stored in repository 120, it can be subsequently provided to driver manger 130 without further refinements.

Executive service 115 and driver manager 130 can perform requested commands for model-based applications using commands and models protocol 182.

Driver manager 130 can then take actions (e.g., actions 133) to implement an operation for a distributed application based on detailed application model 153D. Driver manager 130 interoperates with one or more (e.g., platform-specific) drivers and translators to translate detailed application module 153D (or declarative application model 153) into one or more (e.g., platform-specific) actions 133. Actions 133 can be used to realize an operation for a model-based application.

Accordingly, the generalized intent of declarative application model 135, as refined by executive module 115 and implemented by drivers accessible to driver manger 130, is expressed in one or more of host environments 135. For example, when the general intent of declarative model 153 is implemented in a deployed, specifics of connecting first and second Web services can vary depending on the platform and/or operating environment. When deployed within the same data center Web service endpoints can be configured to use TCP. On the other hand, when the first and second Web service are on opposite sides of a firewall, the Web service endpoints can be configured to use a relay connection.

To implement a model-based operation, tools 125 can send a command (e.g., command 129) to executive service 115. Generally, a command represents an operation to be performed on a model. Operations include deploying, undeploying, updating, monitoring, starting and stopping distributed applications based on corresponding declarative models.

In response to the command (e.g., command 129), executive service 115 can access an appropriate model (e.g., declarative application model 153). Executive service 115 can then submit the command (e.g., command 129) and a refined version of the appropriate model (e.g., detailed application model 153D) to driver manager 130. Driver manager 130 can use appropriate drivers to implement a represented operation through actions (e.g., actions 133). The results (e.g., result 196) of implementing the operation can be returned to tools 125.

Deployed distributed application programs can provide operational information about execution. For example, during execution distributed application can emit event stream 137 indicative of events (e.g. execution or performance issues) that have occurred at a distributed application. In one implementation, a distributed application sends out event stream 137 on a continuous, ongoing basis, while, in other implementations, a distributed application sends event stream 137 on a scheduled basis (e.g., based on a schedule setup by a corresponding platform-specific driver). Driver manager 130, in turn, passes event stream 137 to monitoring service 110 for analysis, tuning, and/or other appropriate modifications. The events emitted in event stream 137 are defined in declarative application model 153.

Driver manager 130 and monitoring service 110 can exchange event streams using monitoring protocol 183.

Generally, monitoring service 110 aggregates, correlates, and otherwise filters data from event stream 137 to identify interesting trends and behaviors of a distributed application. Monitoring service 110 can also automatically adjust the intent of declarative model 153 as appropriate, based on identified trends. For example, monitoring service 110 can send model modifications 138 to repository 120 to adjust the intent of declarative model 153. An adjusted intent can reduce the number of messages processed per second at a computer system if the computer system is running low on system memory, redeploy a distributed application on another machine if the currently assigned machine is rebooting too frequently, etc. Monitoring service 110 can store any results in event store 141.

Figure 1B:
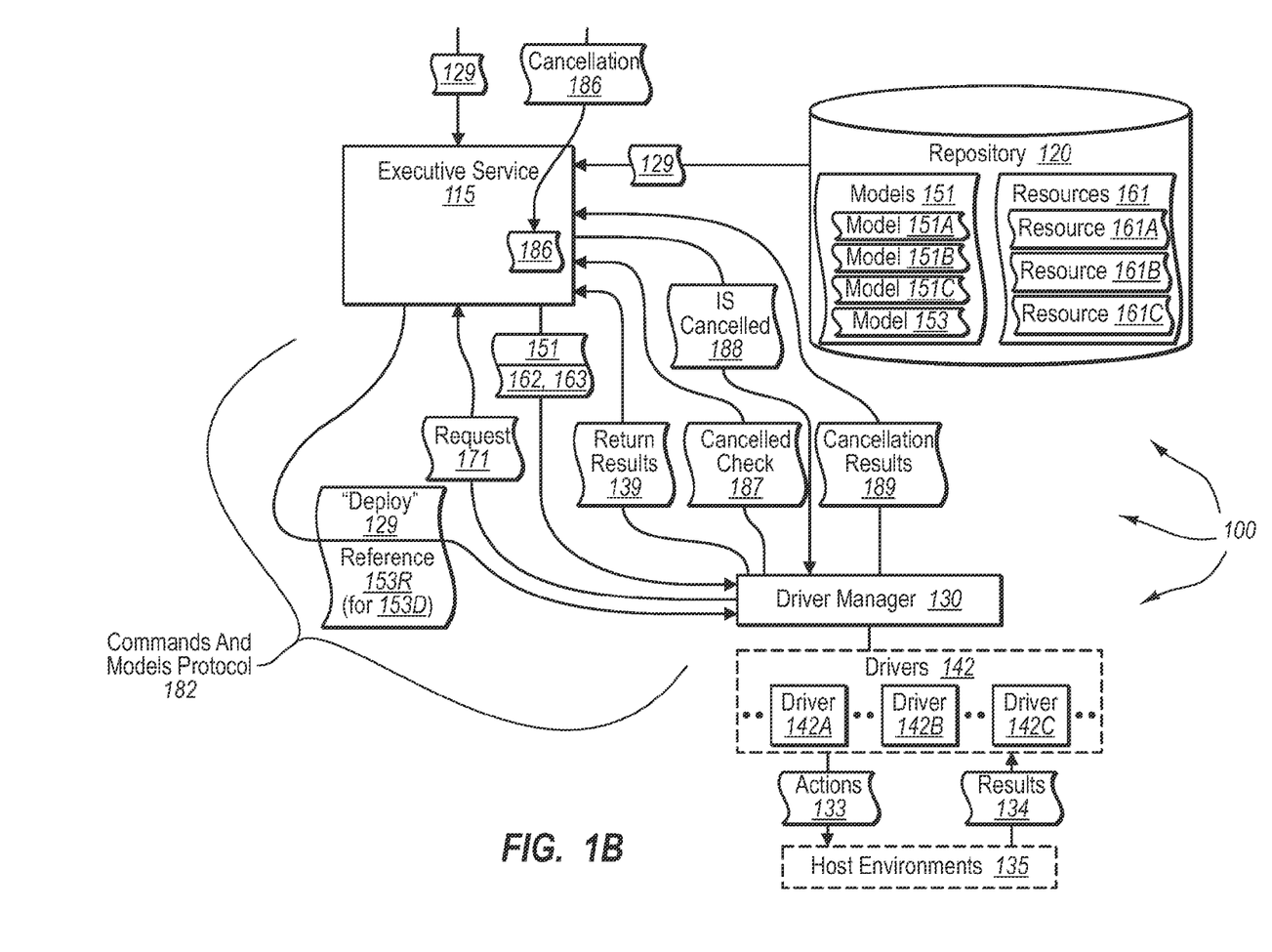
FIG. 1B illustrates a portion of the example computer architecture of FIG. 1A that utilizes a commands and model protocol to implement operations for model-based applications.

FIG. 1B illustrates a portion of computer architecture 100 that utilizes commands and model protocol 182 to implement operations for model-based applications. As depicted repository 120 includes models 150 and resources 160. Models 150 can include a variety of declarative models for distributed applications, including models 151, 152, and 153. Resources 160 can include a variety of different resources, including resources 161, 162, and 163. Resources can be software resources, such as, for example, Dynamic Link Libraries ("DLLs"), configuration files, etc., used to implemented a command for a model.

In some embodiments, one model is used to implement a command for another model. Thus, models can also be viewed more generally as a type of resource. Accordingly, in this description and following claims, the term "resource" is defined to include models.

In FIG. 1B, driver manger is connected to drivers 142 and includes drivers 142A, 142B, and 142C. Each driver in drivers 142 can be configured to process one or more portions of a declarative model based on specified technologies (e.g., WCF-IIS, Aspx-IIS, SQL, Axis-Tomcat, WF/WCF-WAS, etc.) to implement a command for the declarative model. Drivers 142 can send actions 133 to implement commands in host environments 135. The host environments can return results that are forwarded back to driver manager 130

Figure 2:
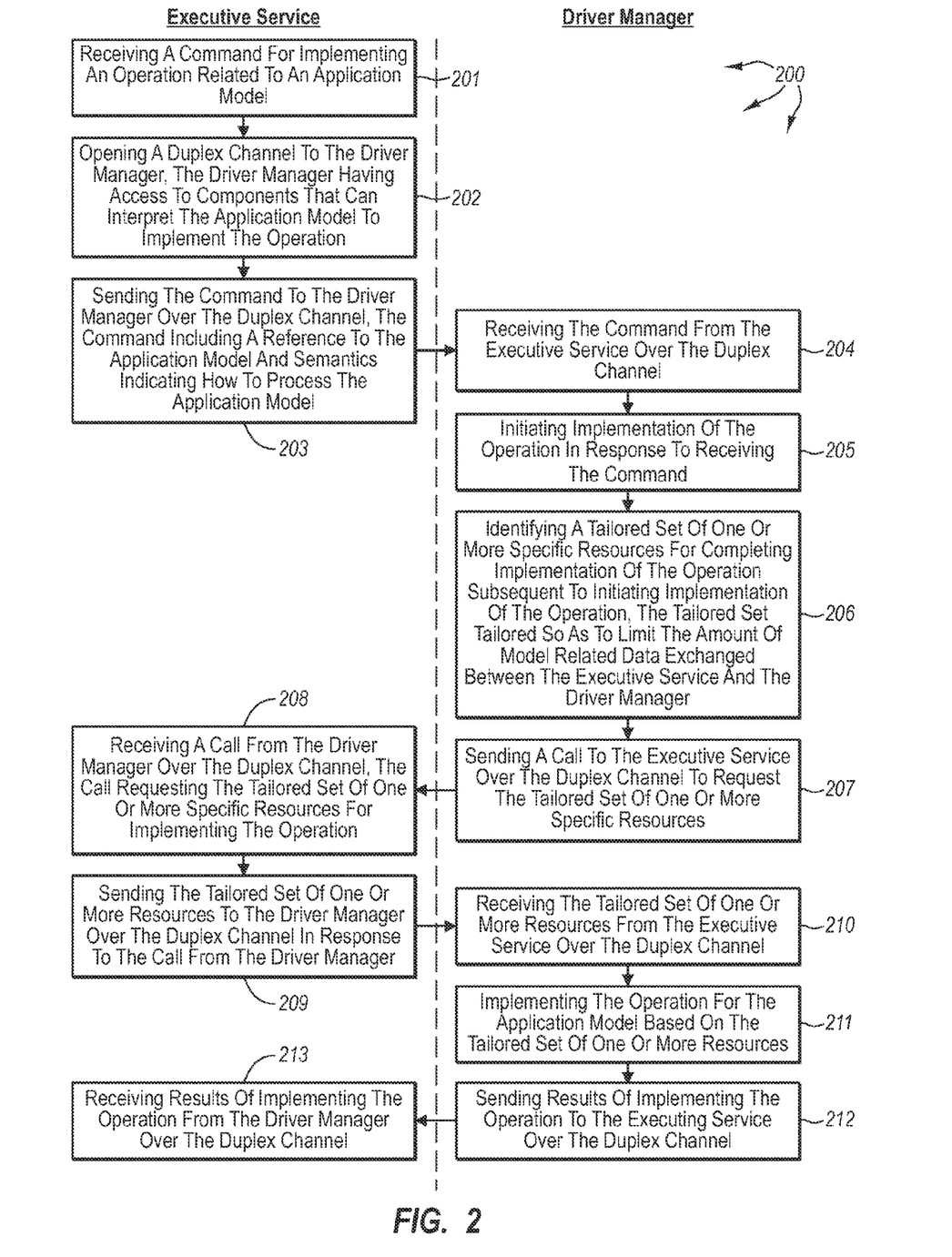
FIG. 2 illustrates a flow chart of an example method for implementing an operation for a distributed application

FIG. 2 illustrates a flow chart of an example method for implementing a operation for a model-based application. Method 200 will be described with respect to the components and data in computer architecture 100.

Method 200 includes an act of the executive service receiving a command for implementing an operation related to an application model (act 201). For example, executive service 115 can receive command 129 for implementing an operation (e.g., deploy, undeploy, stat, stop, update, monitor, etc.) related to declarative application model 153. Method 200 includes an act of the executive service opening a duplex channel to the driver manager, the driver manager having access to drivers that can interpret the application model to implement the operation (act 202). For example, executive service 115 can open a duplex channel to driver manager 130. Driver manager 130 has access to drivers 142 for interpreting detailed application model 153D to implement the operation.

Method 200 includes an act of the executive service sending the command to the driver manager over the duplex channel, the command including a reference to the application model and semantics indicating how to process the application model (act 203). For example, executive service 115 can send command 129, including reference 153R (for detailed application model 153D), to driver manager 130. Command 129 indicates an operational meaning to driver manager 130 representing how to process detailed application model 153D (e.g., framework and host environment) to implement the operation. Detailed application model 153D can be viewed as "top level" model. Detailed application model 153D can include references to other models and resources, portions of which may be required to implement operations for Detailed application model 153D.

Method 200 includes an act of the driver manager receiving the command from the executive service over the duplex channel (act 204). For example, driver manager 103 can receive command 129 from executive service 115.

Method 200 includes an act of the driver manager initiating implementation of the operation through a corresponding driver in response to receiving the command (act 205). For example, driver manager 130 can initiate implementation of the operation through driver 142B in response to receiving command 129. When appropriate, (e.g., based on the type of operation) driver manager 130 can access detailed application model 153D (utilizing reference 153R) to initiate implementation of the operation.

Method 200 includes an act of the driver manager identifying a tailored set of one or more specific resources for completing implementation of the operation subsequent to initiating implementation of the command, the tailored set tailored so as to limit the amount of model related data exchanged between the executive service and the driver manager (act 206). For example, driver manager 130 (through communication with driver 142B and possible other drivers) can identify a set of one or more resources for completing implementation of the operation for detailed application module 153D. Since each driver indicates resources directly, the set of resources can be tailored to decrease the amount of data transferred between executive service 115 and driver 130.

That is, direct indication of resources prevents executive service 115 from initially having to send the same amount of data for each operation, some of which may ultimately go unused depending on the operation. For example, a stop operation may take fewer resources to implement than a deploy operation. However, in absence of direct indications from drivers, there is no way for executive service 115 to know which resources are used to implement which operation. Thus, in absence of direct indication, execution service may simply send all the resources possibly needed for any operation, even though in many cases all of the resources are not used for a particular operation.

Method 200 includes an act of the driver manager sending a call to the executive service over the duplex channel to request the tailored set of one or more specific resources (act 207). For example, driver manager 130 can send request 171 to executive service 115, requesting model 151 and resources 162 and 163. Method 200 includes an act of the executive service receiving a call from the driver manager over the duplex channel, the call requesting the tailored set of one or more specific resources for implementing the operation (act 208). For example, executive service 115 can receive request 171.

In response to request 171, executive service 115 can access model 151 and resources 162 and 163 from repository 120. Method 200 includes an act of the executive service sending the tailored set of one or more resources to the driver manager over the duplex channel in response to the call from the driver manager (act 209). For example, executive service 115 can return model 151 and resources 162 and 163 to driver manager 130. Method 200 includes an act of the driver manager receiving the tailored set of one or more resources from the executive service over the duplex channel (act 210). For example, driver manager 130 can receive model 151 and resources 162 and 163 from executive service 115.

Method 200 includes an act of the driver manager implementing the operation for the application model based on the tailored set of one or more resources (act 211). For example, driver manager 130 can implement the operation for detailed application model 153D based on model 151 and resources 162, and 163. Driver manager 130 can forward the resources to driver 142B (and other requesting drivers). Driver 142B (and other requesting drivers) can then utilize the resources to generated actions 133 for implementing the operation in corresponding host environments 135. Upon completing the operation (e.g., an application is deployed, started, stopped, etc), driver 142A (and other requesting drivers) can report results back to driver manager 130. Driver manager 130 can pack results from different drivers into return results 139.

Method 200 includes an act of the driver manager sending results of implementing the operation to the executing service over the duplex channel (act 212). For example, driver manager 130 can send return results 139 to executive service 115. Method 200 includes an act of the executive service receiving results of implementing the operation from the driver manager over the duplex channel (act 213). For example, executive service 115 can receive return results 139 from driver manager 130.

Driver manager 130 can, from time to time, while working on implementation of the operation, report back to executive service 115 indicating progress and/or can log progress information in a log.

Subsequent to initiating a command, a user may desire to cancel the command. Thus, driver manager 130 can also, from time to time, while working on implementation of the operation, determine if a received command has been cancelled. When a command is cancelled, an indication of the cancellation can be sent to and retained at executive service 115. For example, executive service 115 can receive and retain cancellation 186 cancelling command 129.

Accordingly, driver manager 130 can check with the executive service 115 to determine if the command has been cancelled subsequent to initiating implementation of the operation. For example, driver manager 130 can issue cancelled check 187 to executive service 115. In response to checking, driver manager 130 can receive an indication from the executive service 115 that the command has been cancelled prior to completely implementing the operation. For example, driver manager 130 can receive Is Cancelled 188 from executive service 115. Is Cancelled 188 indicates to driver manager 130 that command 129 has been cancelled.

In response, driver manager 130 can call the corresponding driver to stop implementation of the operation for detailed application model 153D. For example, driver manager 130 can call driver 142B (and any other drivers implementing portions of the operation) to stop implementation. Driver manager 130 can receive an indication from the driver that implementation of the operation has been stopped. For example, driver manger can receive an indication from driver 142B (and any other drivers implementing portions of the operation) that implementation of the operation for detailed application model 153D has been stopped.

Driver manager 130 can return cancellation results to the executive service over the duplex channel. The cancellation results indicate to the executive service that the operation has been cancelled. For example, driver manager 130 can return cancellation result 189 to execute service 115. Cancellation results 189 indicate to executive service 115 that the operation for detailed application model 153D has been stopped.

Figure 3:
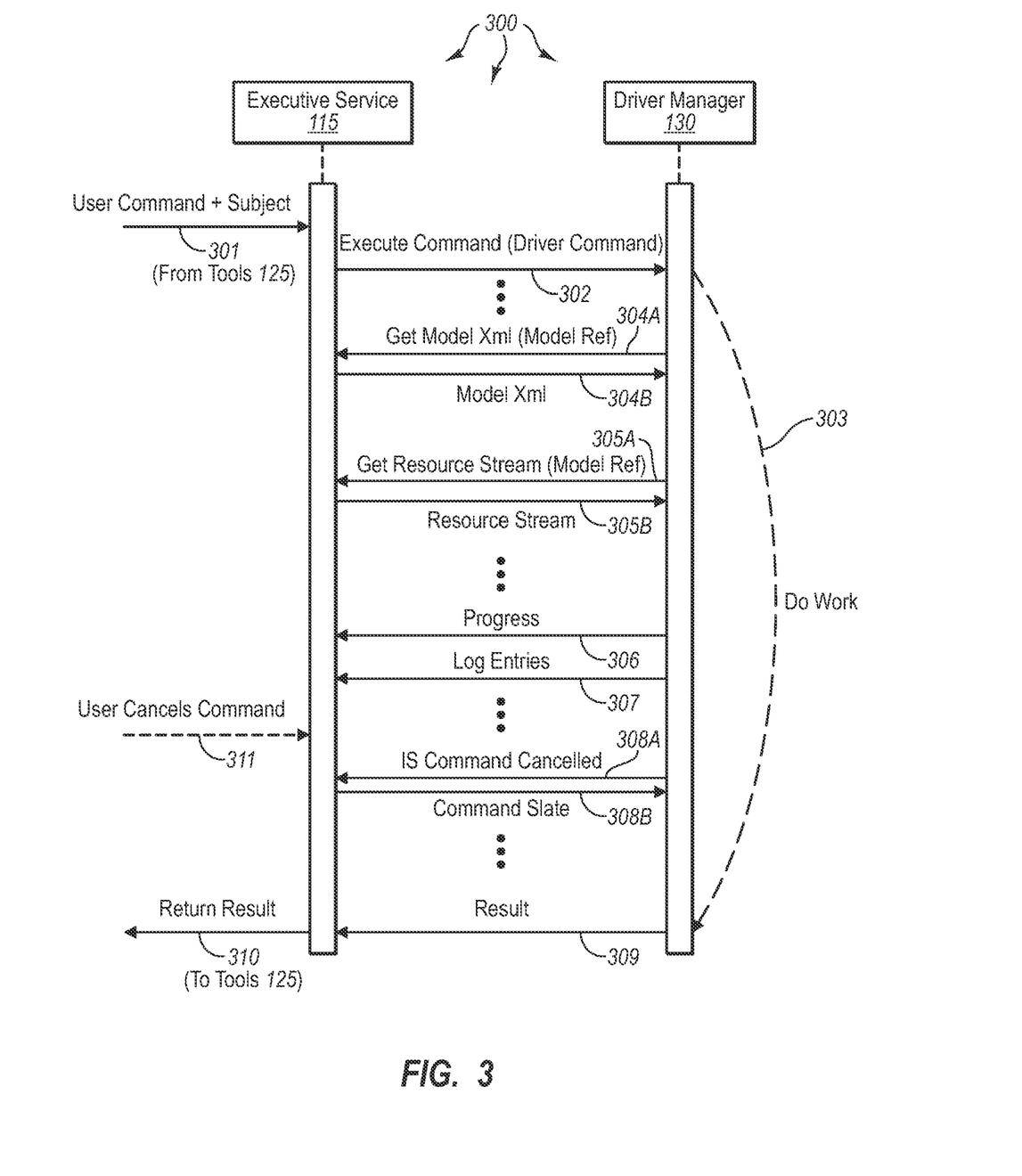
FIG. 3 illustrates an example data flow for a commands and model protocol used between an executive service and a driver manager.

FIG. 3 illustrates an example data flow for a commands and model protocol (e.g., commands and model protocol 182) that can be used between executive service 115 and driver manager 130. Message 301 (from tools 125) commands the executive to perform an operation for an application model. In response to message 301, executive service 115 opens a duplex channel with driver manager 103. Executive service 115 sends message 302 (ExecuteCommand(DriverCommand)) to driver manager 130. Message 302 indicates that an operation is to be implemented for a model. Message 302 can also includes an initial reference to a model that is to be materialized on the application container. The command can be synchronous in nature. Thus, executive service 115 can wait until driver manager 130 completes implementation of the operation indicated in the command.

Driver manager 130 exposes a callback (e.g., on the same endpoint) to executive service 115. Driver manager 130 can use the callback to ask questions to executive service 115, while implementation of the operation is progress in the same session. Reference 303 indicates that driver manager 103 works on implementation of the operation while messages are being exchanged with executive service 115.

For example, driver manager 130 can send message 304A (GetModelXml((ModelRef)) to executive service 115 on the callback channel to request an additional model for implementation of the operation. Executive service 115 can send message 304B (Model Xml) back to driver manager 130 including the requested model in XML serialized form.

In some embodiments, driver manager requests model data from executive service 115 before implementation of the operation is complete. Model data can be retrieved using the initial reference passed with the command and using subsequent references that are included in model data provided by executive service 115. Drivers (e.g., 142B) interoperating with driver manager 130 can request model data in the course of implementing the operation. Accordingly, not all model data needs to be shipped to a driver all the time. For example, start and stop commands utilize a relative small amount of model data. On the other hand, an initial deploy command utilizes a relatively larger amount of model data.

Driver manager 130 can also send message 305A (GetResourceStream(ModelRef)) to executive service 115 on the callback channel to request an additional resources (e.g., DLLs, configuration files, etc.) for implementation of the operation. Executive service 115 can return resource stream 305B, including the requested resources, to driver manager 130.

During implementation of an operation, driver manager 130 can also send messages 306 and/or 307 to executive service 115 to report status back to executed service 115. Message 306 can include operational progress information and message 307 can include log entries. These reporting mechanisms can assist clients of executive service 115 (e.g., tools 125) in tracking their long running commands.

Message 331 indicates that at sometime during implementation of the operation, a user can cancel the command issued in message 301. To accommodate such occurrences, driver manager 130 can periodically or from time to time send message 308A (IsCommandCancelled) to executive service 115. In response to message 308A, executive service 115 can send command state 308B to driver manager 130. Command state 308B indicates if the command issued in 301 has or has not been cancelled.

Thus it may be that while an operation is being implemented, a user instructs the executive service 115 to cancel a command. In response, executive service 115 marks the command as canceling internally. However, executive service 115 does not necessarily cancel the command right away, since drivers may still be working on implementing the corresponding operation. Driver manager 103 can periodically check with executive service 115 by calling the IsCommandCancelled method on the call back channel to see if the command has been cancelled. Driver manager 130 can determine when and how frequently it will check with the executive service 115 about the command cancellation. Since, driver manager 130 is managing several driver activities, driver manger 130 can choose to call back executive service 115 at the end of each driver activity.

If the method IsCommandCancelled( ) on the call back channel returns TRUE, driver manager 130 can finish up any current driver activity. Driver manager 130 can then expressly call result method 309 signaling to executive service 115 that cancellation has completed. Upon receiving this positive ACK from the driver manager 103, executive service 115 can mark the command (e.g., from message 301) as cancelled. Further, if some reason the connection between executive service 115 and driver manager 130 is lost or driver manager 130 and executive service 115 are otherwise unable to communicate, driver manager 103 and/or executive service 115 can stop working on the command.

When implementation of an operation successfully completes, driver manager 103 can also call result method 309 signaling executive service 115 that implementation has completed. Executive service 115 can then close the session and record/report results back to tools 125 in return result 310.

As described in FIG. 3, driver manager 130 can call executive service 115 on a callback to request resources for implementing an operation. In some embodiments, this includes driver manager 130 requesting further model data from executive service 115. Models sent from executive service 115 to driver manager 130 can include various properties, such as, for example, an identifier, a type name, and any of the models scalar properties. A model can also include references for any models the model refers to, such as, for example, children models, models with which it has foreign key relationship (softlinks, associations, etc.), parent models, etc. Model references can include an identifier and a type name that (uniquely) identify a model entity in the repository.

The following XML instructions represent an example model. The XML instructions represent serialized XML that is sent form executive service 115 to driver manager 130. The serialized XML can be sent as the result of driver manager 130 issuing the call GetModelXml(new ModelRef(ID=2, TypeName="ApplicationModule") on the callback channel, while implementation of an operation is in progress.

```
1.<ApplicationModule>
2.   <Name>MywebAppModule</Name>
3.     <ID>2</ID>
4.     <CanDeployToScalableHost>0</CanDeployToScalableHost>
5.     <TypeName>WebApplicationModule</TypeName>
6.     <Parent>
7.        <ApplicationSytemRef>
8.           <Id>12</Id>
9.           <TypeName>WebApplicationSystem</TypeName>
10.       </ApplicationSytemRef>
11.    </Parent>
12.    <Host>
13.       <NodeRef>
14.          <Id>21</Id>
15.          <TypeName>Node</TypeName>
16.       </NodeRef>
17.    </Host>
18.<SoftwareResources>
19.       <SoftwareResourceRef>
20.          <Id>41</Id>
21.          <TypeName>File</TypeName>
22.       </SoftwareResourceRef>
23.    </SoftwareResources>
24.  <ServicePoints>
25.       <ServicePointRef>
26.          <Id>31</Id>
27.          <TypeName>WebServiceProvider</TypeName>
28.       </ServicePointRef>
29.    </ServicePoints>
30.</ApplicationModule>
```

Lines 7-10, 13-16, 19-22, and 25-28 indicate various various ModelRefs that are related to the ApplicationModule (Id=2). Drivers can directly consume the XML form of the model, or use any of the standard mechanisms for de-serializing the raw XML into objects that can then be consumed in a object oriented fashion. Drivers (through driver manager 13) can further callback to executive service for further dereferencing any of the ModelRefs that are embedded in the XML. For dereferencing a ModelRefs that represent software resources (e.g., DLLs, config files), driver manager 130 can use the GetResourceStream( ) method on the callback channel.

In some embodiments, during the execution of a command, executive service 115 creates a new DriverCallbackImpl object that implements the IDriverCommandCallback callback interface. The DriverCallbackImpl object facilitates permits drivers (through driver manager 13) to callback to executive service 115 for accessing model data and to report back progress and results while implementation of an operation is in progress. The DriverCallbackImpl object internally implements access checks to make sure that exposed model data is scoped so that drivers don't have visibility into model data that is not used for implementation an operation. For example, a driver which is told to deploy module 'm1' residing in application 'a1' may not be allowed to fetch any resources/modules belonging to a different application (e.g., 'a2').

To prevent unnecessary (and possibly unwanted) access to model data, the DriverCallbackImpl object can internally maintains a hash table. The hash table contains ModelRefs to all entities the drivers need during the implementation of a specific operation on a given top level model, such as an application Module. Thus, the DriverCallbackImpl object essentially performs a top-down walk of all the model references in an application module chasing down ModelRef references to construct this hash table. After pre-construction of the hash table, any subsequent requests from the drivers to dereference a particular ModelRef can be immediately rejected if it is not already present in the hash table.

In some embodiments, drivers implement idempotent operations in response to commands they receive from driver manager 130. Thus, commands can be run twice yielding the same result, i.e. activities performed during the course of command execution shall yield same results based on same model data. For example, running deploy twice merely ensures that all files and configuration settings that were originally intended are still there. An idempotent file copy operation checks if a file is there and copies only if it is missing.

Idempotent operations allow the system to move forward when facing errors even on multiple nodes (fix model, send command again). Internally drivers can include driver logic for determining how much work they will re-do, if the same command is issued twice in succession (and some/all of the work has already been done during the first command execution). Driver logic is advantageous for connection failure scenarios, where the connection between executive service 115 and drivers is broken. Executive service 115 can reissue a command to the drivers after reestablishing a connection, and the work in the drivers can resume without having to start all over again.

Accordingly, embodiments of the invention permit efficient implementation of operations for model-based applications. Since drivers that are to implement an operation request data for implementing the operation, embodiments significantly reduce the likelihood of superfluous data being exchanged between an executive service and drivers. Further, if an operation is interrupted before implementation is complete, the operation can be resumed without having to re-perform already completed portions of the operation. Additionally, a user can be regularly updated on the progress of their commands.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including an executive service and a driver manager that process declarative application models to implement operations for distributed applications, a method for implementing an operation for a distributed application, the method comprising:

an act of the executive service, within a computer system at least one processor, receiving a command for implementing an operation related to an application model;

an act of the executive service opening a duplex channel to the driver manager, the driver manager having access to drivers that can interpret the application model to implement the operation;

an act of the executive service sending the command to the driver manager over the duplex channel, the command including a reference to the application model and semantics indicating how to process the application model, wherein the application model is a top level model, such that sending the command includes sending a model reference to the top level model;

an act of the executive service receiving a call from the driver manager over the duplex channel, the call requesting a tailored set of one or more specific resources for implementing the operation, the tailored set tailored so as to limit the amount of model related data exchanged between the executive service and the driver manager;

an act of the executive service sending the tailored set of one or more resources to the driver manager over the duplex channel in response to the call from the driver manager; and an act of the executive service receiving results of implementing the operation from the driver manager over the duplex channel.

2. The method as recited in claim 1, wherein the act of the executive service receiving a command for implementing an operation related to an application model comprises an act of receiving a command to implement one of a: deploy, undeploy, monitor, update, start, and stop operation for a model-based application.

3. The method as recited in claim 1, wherein the act of the executive service receiving a call from the driver manager over the duplex channel, the call requesting a tailored set of one or more specific resources for implementing the operation comprises an act of receiving a call requesting further model data from a model referenced in the top level model.

4. The method as recited in claim 1, wherein the act of the executive service receiving a call from the driver manager over the duplex channel, the call requesting a tailored set of one or more specific resources for implementing the operation comprises an act of receiving a call requesting a software resource referenced in the top level model.

5. The method as recited in claim 1, wherein the act of the executive service receiving a call from the driver manager over the duplex channel, the call requesting a tailored set of one or more specific resources for implementing the operation comprises an act of receiving a call on a callback channel.

6. The method as recited in claim 1, further comprising:

an act of the executive service receiving information indicating the progress of implementing the operation from the driver manager prior to receiving the results of implementing the operation.

7. The method as recited in claim 1, further comprising:

an act of the executive service receiving an indication that the received command has been cancelled; and an act of the executive service retaining the indication as command state to provide to the driver manager.

8. At a computer system, the computer system including an executive service and a driver manager that process declarative application models to implement operations for distributed applications, a method for implementing an operation for a distributed application, the method comprising:

an act of the driver manager, within a computer system have at least one processor, receiving a command from the executive service over a duplex channel, the command for performing an operation related to an application model, the command including a reference to the application model and including semantics indicating how to process the application model, wherein the application model is a top level model, such that sending the command includes sending a model reference to the top level model;

an act of the driver manager initiating implementation of the operation through a corresponding driver in response to receiving the command request;

an act of the driver manager identifying a tailored set of one or more specific resources for completing implementation of the operation subsequent to initiating implementation of the operation, the tailored set tailored so as to limit the amount of model related data exchanged between the executive service and the driver manager;

an act of the driver manager sending a call to the executive service over the duplex channel to request the tailored set of one or more specific resources;

an act of the driver manager receiving the tailored set of one or more resources from the executive service over the duplex channel;

an act of the driver manager implementing the operation for the application model based on the tailored set of one or more resources; and an act of the driver manager sending results of implementing the operation to the executing service over the duplex channel.

9. The method as recited in claim 8, wherein the act of the driver manager receiving a command from the executive service over a duplex channel comprises an act of receiving a command to implement one of a: deploy, undeploy, monitor, update, start, and stop operation for a model-based application.

10. The method as recited in claim 8, wherein the act of the driver manager sending a call to the executive service over the duplex channel to request the tailored set of one or more specific resources comprises an act sending a call requesting further model data from a model referenced in the top level model.

11. The method as recited in claim 8, wherein the act of the driver manager sending a call to the executive service over the duplex channel to request the tailored set of one or more specific resources comprises an act sending a call requesting a software resource referenced in the top level model.

12. The method as recited in claim 8, wherein the act of driver manager identifying a tailored set of one or more specific resources for completing implementation of the operation comprises an act of receiving a request for the one or more specific resources from the driver.

13. The method as recited in claim 8, wherein the act of the driver manager sending a call to the executive service over the duplex channel to request the tailored set of one or more specific resources comprises an act sending a call on a callback channel.

14. The method as recited in claim 8, wherein the act of the driver manager receiving the tailored set of one or more resources from the executive service over the duplex channel comprises an act of receiving resources requested by the driver for implementing the operation.

15. The method as recited in claim 8, further comprising:
an act of the driver manager sending information indicating the progress of implementing the operation to the executive service prior to receiving the results of implementing the operation.

16. The method as recited in claim 8, further comprising:
an act of the driver manager checking with the executive service to determine if the command has been cancelled subsequent to initiating implementation of the operation;

an act of the driver manager receiving an indication from the executive service that the command has not been cancelled; and an act of the driver manager continuing to implement the operation in the response to the indication.

\* \* \* \* \*